(No Model.)
M. GARSIDE.
MEANS FOR SECURING CORED CASTINGS TO OTHER PARTS.
No. 307,714. Patented Nov. 4, 1884.
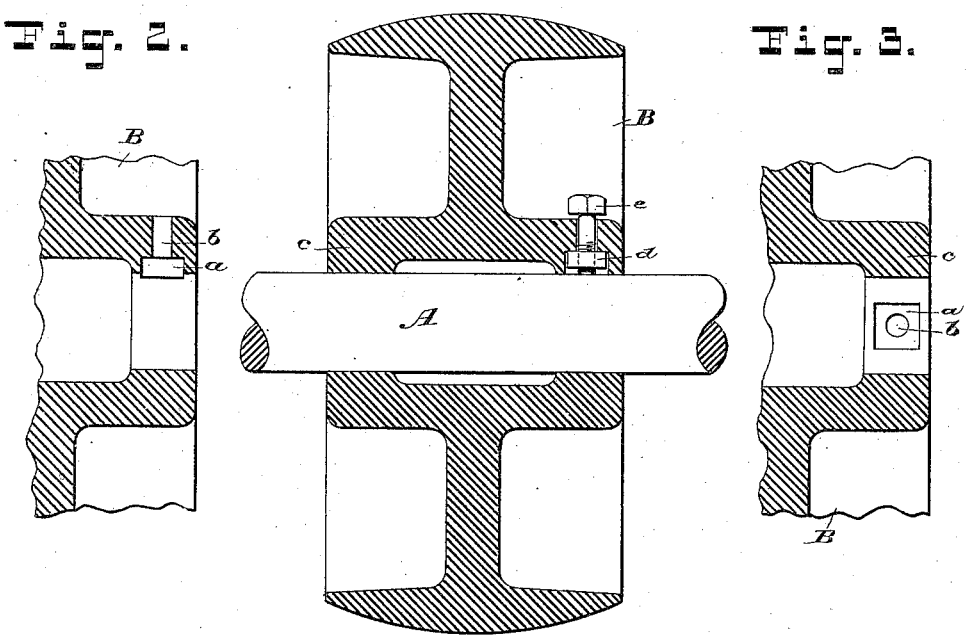
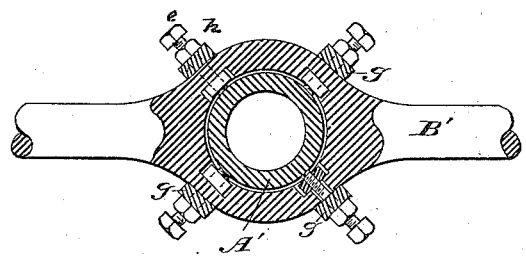
WITNESSES:
Geo. H. Fraser.
Geo. Bainton
INVENTOR:
Melvin Garside,
By his Attorneys,
Burke, Fraser & Connell

UNITED STATES PATENT OFFICE.

MELVIN GARSIDE, OF JERSEY CITY, NEW JERSEY, ASSIGNOR OF ONE-THIRD TO HENRY B. WHEATCROFT, OF NEW YORK, N. Y.

MEANS FOR SECURING CORED CASTINGS TO OTHER PARTS.

SPECIFICATION forming part of Letters Patent No. 307,714, dated November 4, 1884.

Application filed February 28, 1884. (No model.)

*To all whom it may concern:*

Be it known that I, MELVIN GARSIDE, a citizen of the United States, and a resident of Jersey City, Hudson county, New Jersey, have invented an Improved Means for Securing Cored Castings to other Parts, of which the following is a specification.

My invention relates to means whereby a casting, hollowed or cored out, may be secured to another part by means of a set-screw without the necessity of drilling and tapping the cast metal as is usually done. My object is to avoid this drilling and tapping, partly for the sake of economy, partly because it is sometimes very difficult to get at the part with a drill or tap, and partly because some of the inferior qualities of cast-iron which are otherwise good enough will not stand tapping. The ordinary method of securing a cast-iron pulley to a shaft, for example, is to core out the boss or hub, bore it to fit the shaft, drill radially through the hub, and then tap the hole thus drilled. In such cases the pulley-rim is usually in the way, and it is frequently necessary to employ special machinery to drill and tap for the set-screw. In my construction I avoid this drilling and tapping by coring out within the hollow or bore of the hub a square or polygonal recess to receive a nut, and I also core out an opening to receive a set-screw, extending from said nut-recess to the outside of the hub. In securing the pulley to the shaft it is only necessary then to place the nut in its recess and insert the set-screw from the outside. The screw engages the nut, and the pressure of its tip or point on the shaft causes the nut to press against the roof of its recess as a resistance. The nut sets back in the recess far enough to leave a free passage-way for the shaft. In other applications of my invention the screw may act to secure the casting to the shaft or other part that passes through the casting, and may also serve as a bolt to secure a piece exteriorly to the casting. In this case the set-screw passes also through the piece to be secured exteriorly, and a nut on the set-screw is screwed down on said piece to hold it firmly in place.

In the drawings I have shown several applications of my invention.

Figure 1 is a sectional view of a pulley secured to the shaft according to my invention. Figs. 2 and 3 are fragmentary sectional views of the boss or hub of the pulley. Fig. 4 illustrates the application of my invention to the cross-piece of a lamp-post, and shows the means for attaching separate pieces exteriorly, as will be fully set forth hereinafter.

Referring, first, to Figs. 1, 2, and 3, A is an ordinary shaft, and B a cast-iron pulley mounted thereon. The hub of this pulley is cored out inside in the usual way, and bored to fit the shaft. In order to secure the pulley to the shaft, I core out in casting it a nut-recess, $a$, (seen best in Figs. 2 and 3,) and a screw-hole, $b$, which extends through the metal of the hub from the recess $a$ to the outside, as clearly shown. These being cast in the hub, little or no expense is incurred. In securing the pulley on the shaft it is now only necessary to first place the nut $d$ in the recess $a$, then pass the shaft through, and then insert the set-screw $e$ until it properly engages the nut $d$. Now, by turning the screw it passes through the nut (which cannot turn, being embraced by the walls of the recess) and impinges on the shaft. The nut is now caused to press against the roof of the recess $a$, which provides the necessary resistance. Thus I avoid the drilling and tapping of the hub, as will be well understood.

Fig. 4 illustrates a means for attaching the cross-bar to the top of a lamp-post, and the attachment to said bar of the rods which support the lamp. A' represents the post, and B' the cross-bar, which has a hole or aperture cored out in it to receive the post. To this bar are secured the rods $g$, which support the lamp. This differs from the application first described, in that the set-screws $e$ serve not only to secure the bar B' to the post, but also to secure the rods $g$ to the said bar. It is necessary in this construction to provide nuts $h\,h$ on the set-screws, which are screwed down upon the rods $g$, so as to hold them firmly to the bar B'.

In this application I am enabled to employ inferior iron for the bar B', as there are no screws formed in it, whereas in the usual method, where the cross-bar is drilled and tapped, it must not only be of better iron than that usually employed for the post, but the expense of drilling and tapping must be incurred.

I may apply my invention to various purposes where cored castings are to be secured to other parts, and where a free opening is to be left for the passage of parts which fit more or less closely in the cored and cast parts, as in the examples shown. It is only necessary that the recess to receive the nut shall be of such a form as to prevent the nut from turning, and be deep enough to prevent it from projecting into the interior opening.

I may employ any number of set-screws in the pulley-hub. Indeed, as it costs almost nothing to provide for them in casting the pulley, I may provide for any number, and the user may employ as many screws as he thinks will be needed. In the case of cast set-collars, the drilling and tapping for the set-screws is the greater part of the cost of making them. This expense I avoid entirely by my construction. In forming the recess $a$ for the nut in the pulley-hub, set-collar, or similar thing, it is sometimes convenient to cast an annular recess in the hub as wide as the nut, and arrange all of the screw-holes $b$, if more than one, to enter this. This annular recess might be turned out in boring the pulley-hub, but it is as well to core it out.

I am aware that it is not new to cast wrought-iron nuts in cast-iron articles, but this method has serious practical objections well understood by those skilled in the art. It is very difficult to set the nut accurately in the mold, and the union between the cast and wrought metal is apt to be imperfect. If the nut-thread becomes worn, the nut cannot be replaced.

My removable nut has the same advantages that the above has over the drilling and tapping of the cast metal, and the additional advantages that no new drilling and tapping is required in case the thread of the nut becomes worn. The user has only to substitute another nut, and thus avoid material loss of time.

It will be observed that I may employ set-screws and nuts varying somewhat in size. This is an advantage in case the thread should strip or wear, as it is not always convenient to duplicate the parts.

As set-screws are provided with threads to fit ordinary nuts, if the nut should be worn another ordinary nut may be readily substituted. I would also say that I am well aware that it is not new merely to cast recesses and apertures in castings to receive the shanks and heads of bolts. This I do not claim.

Having thus described my invention, I claim—

As a means for securing a hollow casting, as a pulley-boss, to another part, as a shaft, the said boss provided with a nut-recess, $a$, and a cored screw-hole, $b$, in combination with a nut and set-screw, all constructed and arranged substantially as set forth.

In witness whereof I have hereunto signed my name in the presence of two subscribing witnesses.

MELVIN GARSIDE.

Witnesses:
HENRY CONNETT,
ARTHUR C. FRASER.